Nov. 3, 1942.　　　　G. C. ARMSTRONG　　　　2,300,900
CONTROL DEVICE
Filed Oct. 21, 1938　　　　4 Sheets-Sheet 2

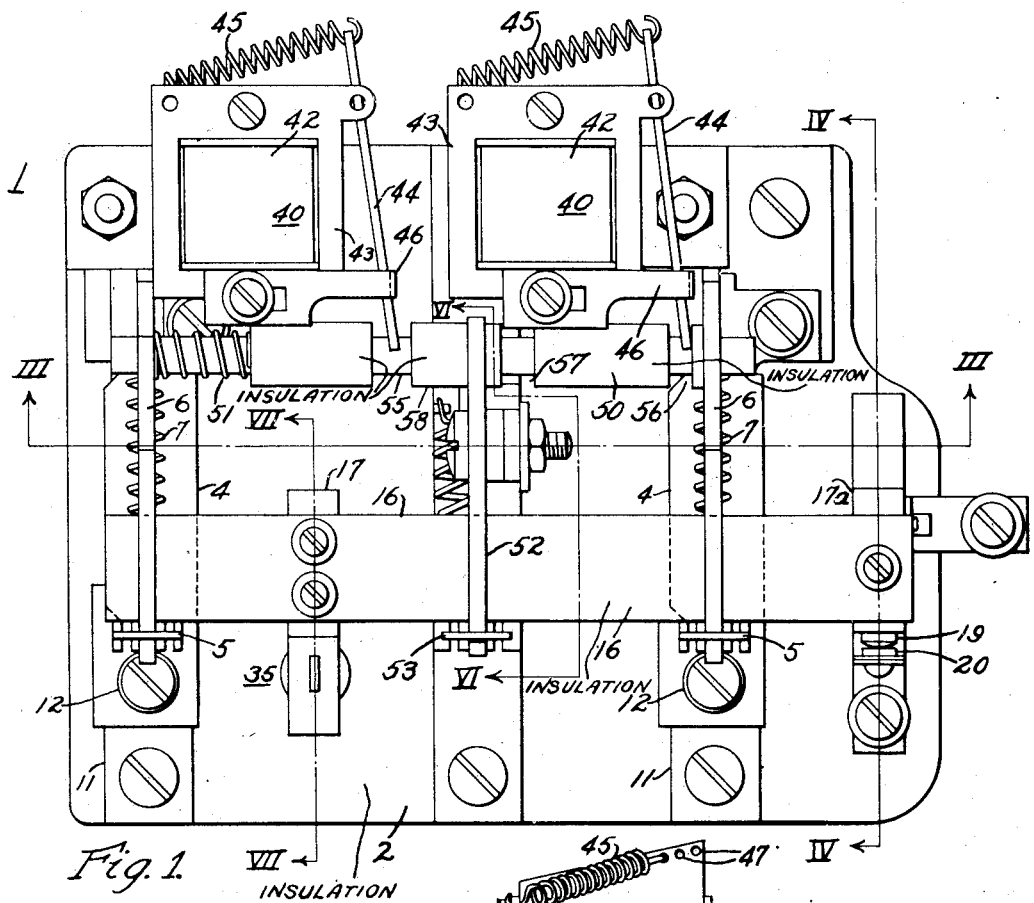

WITNESSES:
Leon M. Garman
J. S. Foster

INVENTOR
George C. Armstrong.
BY
Paul E. Friedemann
ATTORNEY

Nov. 3, 1942.                G. C. ARMSTRONG                 2,300,900
                              CONTROL DEVICE
                         Filed Oct. 21, 1938        4 Sheets-Sheet 3

WITNESSES:
Leon M. Garman
J. E. Foster

INVENTOR
George C. Armstrong.
BY
Paul E. Friedemann
ATTORNEY

Patented Nov. 3, 1942

2,300,900

UNITED STATES PATENT OFFICE 2,300,900

CONTROL DEVICE

George C. Armstrong, Wilkinsburg, Pa., assignor to Westinghouse Electric & Manufacturing Company, East Pittsburgh, Pa., a corporation of Pennsylvania Application October 21, 1938, Serial No. 236,217

14 Claims. (Cl. 200—88)

My invention relates to control devices and more particularly to control devices for actuating over-load relays, circuit-breaker-trip devices, measuring or indicating instruments or the like.

In my application Serial No. 139,976, filed April 30, 1937, and entitled Control devices, which application became Patent No. 2,162,521 on June 13, 1939, I disclose certain details of construction of a thermal relay or control device suitable for use as a motor starter, in which heat-responsive elements are provided as a means for procuring a more accurate indication of the thermal condition of the motor and thereby providing by such indicated condition a more accurate control of the motor before dangerous conditions may be developed in the motor.

In that previous application, my invention was particularly directed to the type of heat-responsive device, particularly a bimetal member having a larger heat storage capacity or mass while at the same time retaining the sensitivity of a bimetal member of lesser mass.

In the present application, I am concerned with providing an arrangement that shall establish a modified inverse time characteristic in the operation of the thermally responsive bimetal element, either without increasing the normal mass or heat storage capacity of that thermally responsive element, or, in conjunction with such changes, to further modify the time characteristics of the relay.

I am also concerned in this application with the provision of means for instantaneously tripping the device upon the occurrence of short-circuit conditions, or extremely rapid excessive current changes.

To increase the operating time of a bimetallic heat-responsive element, one method is to increase its mass so that it will take longer for such element to change its effective temperature. If the mass of a bimetallic element is increased by merely increasing the thickness thereof, the temperature necessary for the operation of such an element will likewise be increased for a given length of such element. This condition would then require an increased wattage for a given length, or would require an element of increased length with the same heat supply, to produce a given deflection. However, since the physical characteristics of those devices which use a bimetallic element impose certain limits on the size of such element, or the amount of heat to be supplied to such element, such limitations have presented a problem in establishing and procuring proper desirable operating time characteristics in a bimetal element.

It is accordingly an object of my invention to provide a modified bimetallic heat-responsive device which shall be small, compact and sensitive, and which shall be capable of providing an inverse time element characteristic, that is, a time interval in its operation, that shall be disproportionately greater at higher current values.

Thus, one of the principal objects of my invention is to provide an arrangement for increasing the time delay in a thermal overload relay without modifying the mass or thermal capacity of a standard thermally responsive unit that is normally employed in a manufactured line of such relays or control devices; or, to provide an arrangement for increasing the time element or interval of operation beyond that which could be procured by modifying the mass of thermal capacity of the thermally responsive unit.

A further object of my invention is to provide an instantaneous trip device for controlling the operation of the relay in conjunction with the control action established by the heat-responsive element.

A still further object of the invention is to provide joint means to disproportionately control the energization of the heat-responsive device according to the circuit current, and cooperating means which shall be controlled by such energizing means to distinguish between normal overload conditions and short-circuit conditions, and to effect instantaneous tripping of the device upon the occurrence of short-circuit conditions.

In the thermal relay to which I have applied my invention herein, for the purpose of specific illustration, the thermally responsive bimetal is heated by a heater energized from the circuit to be protected. In the case of heavy overloads or short-circuits, the heater currents might be high enough to burn out the heaters. Protection for the heaters against excessive current is therefore desirable and necessary.

A saturating transformer may be used between the circuit and the heater, and it introduces a means of protection by reducing the value of high current supplied to the heater, but, in some cases, the current may still be high enough to burn out the heater. Moreover, where it is applied to existing relay installations, the circuits must be opened and the connections re-arranged to accommodate the transformers.

Still further, the transformer itself may be overheated unless it be of excessive size, and thereby may contribute further to the expense of such an installation.

It is desirable, therefore, to supplement the mere reduction of current to the heaters and to provide means for protecting the heater, or means for protecting both the heater and the transformer, when the transformer becomes energized to such a degree as to become saturated. For that purpose I provide a magnetic trip attachment to be actuated by the stray magnetic field of the transformer when it saturates, thereby to protect both the heater and the transformer. By so protecting the relay heater and the transformer, a smaller transformer may be employed. In order to utilize the saturated condition of the transformer as an indication and control function, I provide a pivoted armature adjacent the transformer structure to be attracted by the stray or leakage flux of the transformer, when the transformer core saturates, and arranged the armature to serve as a trip attachment for the relay, or for an external circuit to a circuit breaker.

Instead of using a saturable transformer, I may employ a saturable reactor or inductive shunt, which may be considered a one-to-one auto-transformer, for connection across a heater. The shunt may be mounted on the relay without requiring an increase in mounting space or in cabinet size. Each shunt is similarly provided with a pivoted armature, which is actuated by the stray flux field, after saturation, to trip the relay contacts that control the circuit to a protective circuit breaker.

Other objects of my invention will either be pointed out specifically in the course of the following description of a device embodying my invention, or will be apparent from such description.

In the accompanying drawings:

Figure 1 is a plan view of a relay provided with a saturable core reactor having an armature according to my invention;

Fig. 2 is a side elevational view of the relay shown in Fig. 1, looking at the left-hand side of the relay in Fig. 1;

Figure 5:
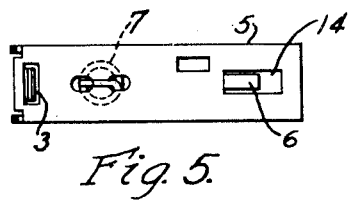
Fig. 5 is a view of one of the latching members as it appears in a view of the relay shown in Fig. 2 taken along the line V—V.

Referring to the drawings, a thermal overload relay 1 is shown comprising a base 2, a plurality of heat-responsive devices or bimetal members 3 and heaters 4.

The heaters 4 are shown as channel-shaped radiant heaters removably attached to terminal blocks 11 by means of shoulder screws 12. The bimetallic device 3 may comprise one or more separate bimetallic elements any may be rigidly attached at one end to the latch members 6 by suitable means such as rivets 10, and are located within the channel-shaped radiant heaters 4.

It is to be understood that the radiant heater 4 and the bimetallic member 3 may be located within any desirable insulating fluid such as air, or a controlled atmosphere, and that such bimetallic structure will flex in response to the heated circumambient fluid. The actuating element 5 may be removably mounted upon the free end of the bimetallic member 3, and may be held in swingable relation thereto by means of the helical spring 7 attached at one end to the actuating element 5 and at the other end to the stationary latch member 6. The actuating element 5, when in latched position, is held by spring 7 substantially normal to base 2 with the upper end of the actuating element 5 held against a shoulder 13 of the latch member 6. The outer end of the latch member 6 extends through an aperture 14 in the actuating element 5.

Figure 7:
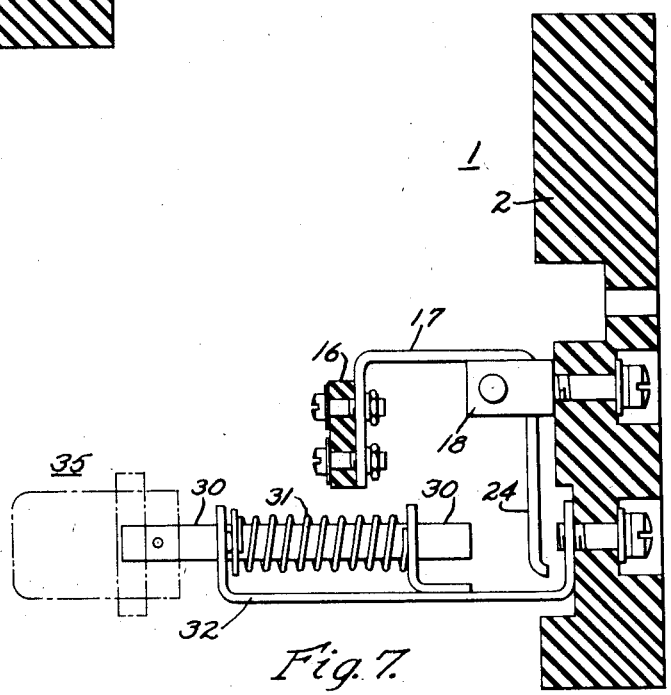
Fig. 7 is a sectional view of the relay of Fig. 1 taken along the line VII—VII thereof to show the reset member.

The cross-bar 16 is swingably mounted upon the base 2 by means of levers 17 and 17a, which are rotatably mounted upon brackets such as 18 (see Fig. 7). A contact 19 is rigidly attached to the lever 17a and engages a contact 20 rigidly attached to the free end of a flexible resilient finger 21, which in turn is rigidly attached at its other end to bracket 22.

Figure 4:
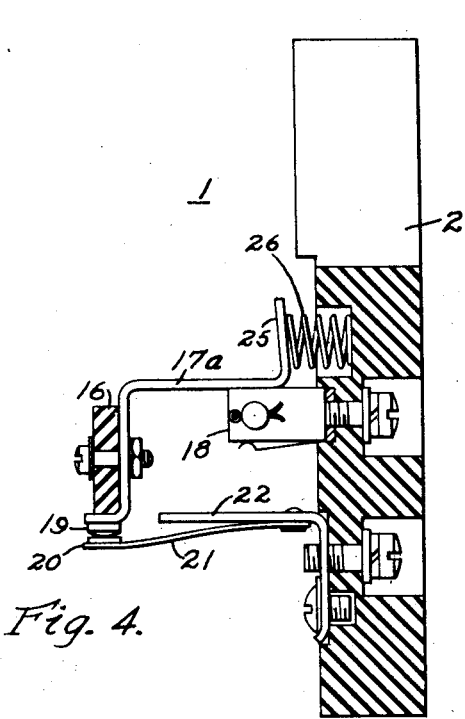
Fig. 4 is a sectional view of the relay taken along the line IV—IV of Fig. 1.

While the bimetallic structure 3 flexes downwardly or away from the stationary latch member 6, due to the heat radiated from heater 4, the actuating element 5 is likewise moved from the latch member 6 along its shoulder portion 13 and toward the base 2 until the aperture 14 becomes free of the shoulder portion 13 which in turn, permits the spring 7 to pull the actuating element 5 upwardly along the latch member 6, and about the free end of the bimetal 3 as a center, as viewed in Fig. 2. When the actuating element 5 is released at latch member 6, it engages the cross-bar 16, and moves the cross-bar 16 with it in response to spring 7. When the cross-bar 16 is swung upwardly, as hereinabove described, the levers 17 and 17a are correspondingly rotated about their respective pivots on brackets 18, and disengage the contact 19 from the contact 20, while an extended lower arm portion 24 (Fig. 7) of lever 17 contacts a manual reset plunger 30 slidably mounted upon a bracket 32 of a manual resetting device 35. At the same time, an extended arm 25 of lever 17a compresses a reaction compression spring 26 (Fig. 4).

The operation of the device may be restated briefly as follows:

The lever 17a and a similarly pivoted lever 17 carry a cross bar 16 which is engaged by actuating elements 5, 5 and 53 to move the switch 19—20 to open position. The actuating elements are movable by springs 7, 7 and 59 (which are stronger than springs 26, and which will readily overcome their biasing action). The actuating elements, however, are normally held against actuation by the stationary latch members 6, 6 and the pivoted latch member 52. The latch member 52 is tripped by one of the armatures 44 acting through the rod 50 (as will be described more fully hereinafter). Each of the actuating elements 5, 5 may be moved longitudinally towards support 2 by its respective thermostat 3 to free it from the restraint of the corresponding latch member.

To reset the relay and re-establish contact between the contacts 19 and 20, the plunger 30 of the manual resetting device 35 is forced inwardly against the action of a spring 31, causing the extended arm portion 24 of lever 17 to return to its normal position substantially parallel to the base 2. Simultaneously with such action, the cross-bar 16 is returned to its normal operating position, re-engaging contacts 19 and 20, and re-latching operating members 5 upon the shoulder portion 13 of the latch members 6. The reaction spring 26 maintains the normal contact pressure.

When the channel-shaped radiant heaters 4 are operatively connected with a power circuit by means of the terminal blocks 11 and the shoulder screws 12, the heat radiated therefrom is substantially proportional to the power fluctuations of such circuit. Consequently, the bimetallic structures 3, being located within the respective radiant heaters 4, will likewise respond to the power fluctuations of such circuit. The control-circuit contact members 19—20 may be connected to control the circuit of an external power circuit controlling device, to protect an associated motor and the associated reactors and the relay against overheating.

To adapt a thermal relay, as hereinabove described, to the characteristics of various power circuits, it has been the practice to connect the radiant heaters 4 of such relays to such power circuits by means of saturating current transformers. By the use of such transformers, the amount of power directly applied to the radiant heaters 4 may be adjusted and limited to the requirements of the particular circuit and relay. Consequently, the relay may operate with any set time characteristic for a given load or upon a delayed time characteristic with the same load, providing the transformers or the heaters operatively associated therewith have been correspondingly changed.

In the present case, I have applied a saturating core reactor directly across the terminals of the relay, where the heaters 4 are already connected. Such connections do not require any disturbance of the existing connections of the heaters to the terminals, and permit the ready application of such saturating core reactors to relays or other devices already in service, without requiring the disturbance of those connections. Such reactors also permit a more flexible adaptation of the control devices for various applications by modifying the design of the reactors and their characteristics to establish a desired corelation with the relays.

The reactor is, of course, smaller than a transformer since it embodies only one winding instead of two, and carries only a very small fraction of the line current except at high overloads. A disadvantage of such a saturating transformer is that it is bulky and expensive. Moreover, it cannot be readily applied to control devices already in service, or to already designed devices, without requiring a modification of the circuit connections, and providing additional mounting space. The reactor thus requires much less space than the saturating transformer with two windings.

In addition to providing the inverse time element characteristic by means of the reactor, I utilize the reactor saturation to distinguish between normal overload conditions and short-circuit conditions, so that an interruption of the power circuit may be secured upon the occurrence of short-circuit conditions.

The reactor 40 in Fig. 2 is shown on the left-hand bracket or frame 41 which is provided for the trip-restraining bracket 6. The reactor 40 comprises briefly a coil 42 and an encircling laminated magnetic structure 43, upon which is pivotally supported a magnetizable armature 44 that is biased away from the magnetizable structure 43 by a biasing spring 45 and limited to a maximum separation by a non-magnetizable stop arm 46. The biased edge of the armature 44 is provided with an inclined row of openings 47 to permit the biasing spring 45 to be selectively and adjustably positioned.

Figure 6:
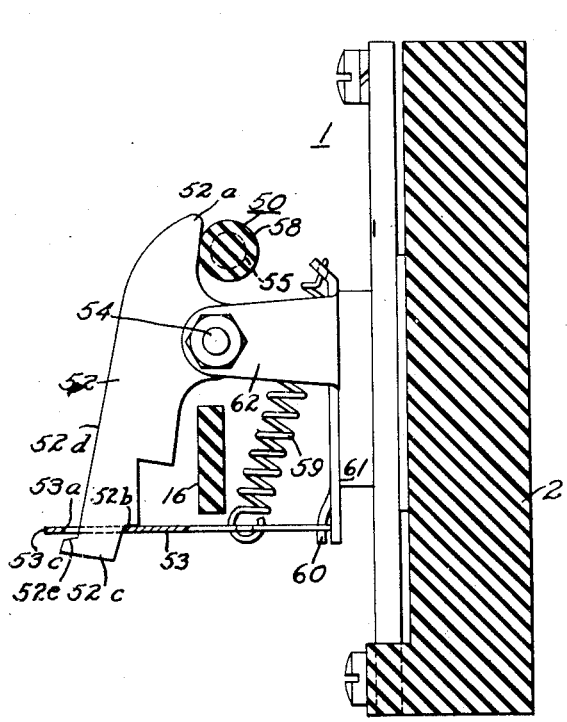
Fig. 6 is a side elevational view of a tripping latch release rod controlled by the armature of the saturating core reactor.

The outer end of the pivoted armature 44 is disposed in position to establish a cooperative control relationship with a transversely located tripping rod 50 that is supported for axial movement between the two stationary latch members 6 on each side of the control device, disposed directly above the respective heaters 4. The trip rod is preferably of non-magnetizable and electrically insulating material, and may be made, for example, of material sold under the trade-name Micarta, or of some similar or equivalent functioning insulation material, and is normally biased by a biasing spring 51 to its extreme right position. In that extreme right position, which is the normally untripped position, the trip rod 50, as shown in Figs. 1 and 6, holds a centrally located and pivotally mounted latch member 52 in position to control an actuating element 53, similar to the two actuating elements 5 that are associated with the bimetal elements 3.

The trip rod 50 is provided with two peripheral annular grooves 55 and 56 into which the respective armatures 44 of the two saturable reactors 40 normally extend. A similar peripheral groove 57 is provided into which the rear arm 52a, of the latch member 52, may fall (Figs. 1 and 6) to release the actuating element 53, at the shoulder 52b of the front arm 52c, when the trip rod 50 is shifted axially, against its biasing spring 51, by either one of the armatures 44 of the respective reactors.

In the normal untripped position of the relay, as shown in Fig. 1, the rear arm 52a of the lever 52 (Fig. 6) rests upon the peripheral surface 58 of the transverse trip rod 50 in such manner as to hold the actuating element 53 against movement in response to its spring 59. The inner end of the actuating element 53 is pivotally supported on a stationary extension finger 60 on the bracket 61 whose side arm 62 serves also to pivotally support the latch member 52. The outer end of the actuating element 53 is provided with an opening 53a through which the lower end 52c of the latch member extends. As illustrated in Fig. 6, the actuating element 53 rests against the small shoulder 52b which holds the actuating element 53 against movement around the pivotal finger 60 as a center.

To release the actuating element 53, the trip rod 50 must be actuated by one of the reactor armatures 44. During normal load conditions, practically the entire load current will pass through the heaters whereas only a very small current will pass through the reactors, in view of the relatively high impedance of the reactor compared to the resistance of the heaters, which are non-inductive. For normal load conditions, the bimetallic device 3 will respond to the heaters to control the operation of the relay.

As the load current increases to values above normal load values, the current distribution between the heaters and the reactors will change. As the load current increases, the proportionate division of load current through the reactor tends to establish a saturated condition in the reactor.

Such saturated condition in turn tends to diminish the impedance of the reactor. Consequently, as the impedance of the reactor diminishes, the relationship between the impedance of the reactor and the resistance of the heater becomes modified and a proportionately greater portion of the load current traverses the reactor.

When the reactor becomes fully saturated by its current, an abnormal condition is indicated, at which time it is desired to operate the relay instantly to open the circuit to the associated motor.

At this time, in view of the saturated condition of the reactor core 43, sufficient stray flux is generated to attract the armature 44 and to cause it to actuate the trip rod 50. Depending upon the condition of the circuit to the motor, that is, whether it is balanced or unbalanced, the heaters and the associated reactors may be similarly and equally energized or unequally energized. Thus, either reactor armature, or both reactor armatures, will operate the trip rod 50 to permit the latch member 52 to rotate about its pivot 54 sufficiently to permit the actuating element 53 to be moved by the biasing spring 59 to operate the cross-bar 16 and to disengage the contacts 19 and 20.

When the latch member 52 is released by the trip rod 50, and rotates about its pivot 54, due to the off-center turning force of the actuating element 53 against the shoulder 52b, the shoulder 52b rises until it reaches the opening 52a in the actuating element 53, whereupon the actuating element 53 is freed to turn about its pivotal support finger 60 to engage bar 16 and to separate contacts 19 and 20. The upper edge of the opening 53a then engages the back, or top edge, 52d of the latch member 52.

When the relay is subsequently reset, and the cross-bar 16 moved forward again to engage and move the actuating element 53 downward to its reset position, the outer end 53c of the actuating element will engage the projection 52e of the latch member 52 will turn the latch member 52 enough to raise the back arm 52a out of the slot in the trip rod 50 and allow the trip rod to resume its non-operated reset position to hold the latch member 52 in effective position. While the trip rod 50 resets itself, the actuating element 53 continues to move forward as pushed by the cross-bar 16. The top edge of the opening 53a is high enough to move over the top projection 52e of the actuating element front 52c when the latch member 52 is rotated to reset position, in order to permit the cross-bar 16 to move forward sufficiently, on resetting, to be able to reset the right and the left-hand actuating elements 5 and 53 without requiring the alignment of the actuating elements to be extremely accurate.

Figure 11:
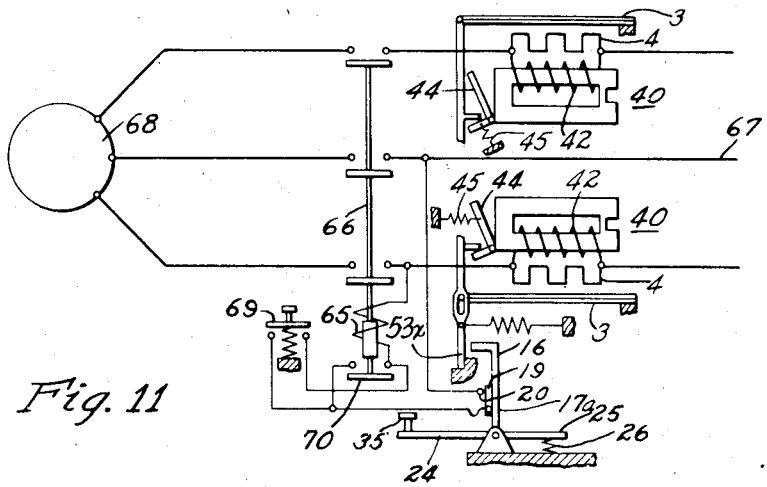
Figs. 11, 12 and 13 are simple diagrams of circuits containing thermal relays embodying the principles of my invention.

The contacts 19 and 20 open an external circuit, as illustrated, for example, in Fig. 11, to deenergize the energizing and holding coil 65 on the contactor switch 66 connecting the supply line 67 to the control motor 68.

The principle of operation of the relay is generally indicated by the schematic arrangement of corresponding elements of the relay in the diagram of Fig. 11. As is evident from that diagram, operation of a bimetallic element 3, or of an armature 44, will operate the element, equivalent to the actuating element 53, to move against the trip bar 16 and cause it to separate the contacts 19 and 20.

When the relay is to be reset, the reset button 35 is operated, as previously explained in Fig. 7. The remaining details of the resetting structure of Figs. 4 and 7 are schematically illustrated in the diagram of Fig. 11.

After the relay has been reset, the contactor switch 66 may be reclosed by momentarily energizing the circuit of the operating coil 65 through a push button 69. The contactor 66 then locks itself in through its back interlock contact 70.

By means of the arrangement just illustrated, the relay may be operated by the direct trip armature 44 of the reactor 40 to open the holding circuit of the contactor, thereby disconnecting the motor on the occurrence of excessive load or short circuit conditions.

Figure 13:
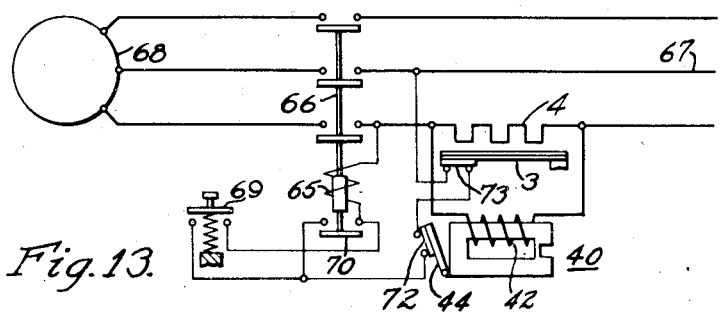

In Fig. 13, I have illustrated a modified control arrangement wherein the armature 44 associated with the reactor 40 controls a switch 72 for a pair of contacts directly, so that upon the occurrence of the saturated condition in the reactor 40, attended by attraction of the armature 44, the switch 72 will be opened to deenergize the associated circuit to disconnect the motor 68. In this case, the contact switch 72 is illustrated as controlling the circuit of the contactor 66 in series with a similar switch 73 controlled by the bimetal member 3.

Although I have illustrated the application of a reactor to the thermal relay described herein, merely to show a preferred structure, the same principle of my invention may be applied to a combination employing a saturable transformer, with two windings, in the same manner as is illustrated in the application to a single winding reactor.

For the modification involving a transformer, my invention contemplates disposing a pivoted magnetizable armature adjacent the magnetic core of the transformer where the armature will be attracted by the stray flux after saturation.

Figure 8:
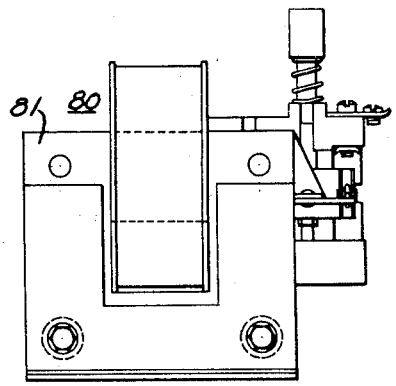
Figs. 8, 9 and 10 are plan, and side views, respectively, of a saturable transformer provided with an armature responsive to stray flux for controlling contact members to an external circuit.
Figure 3:
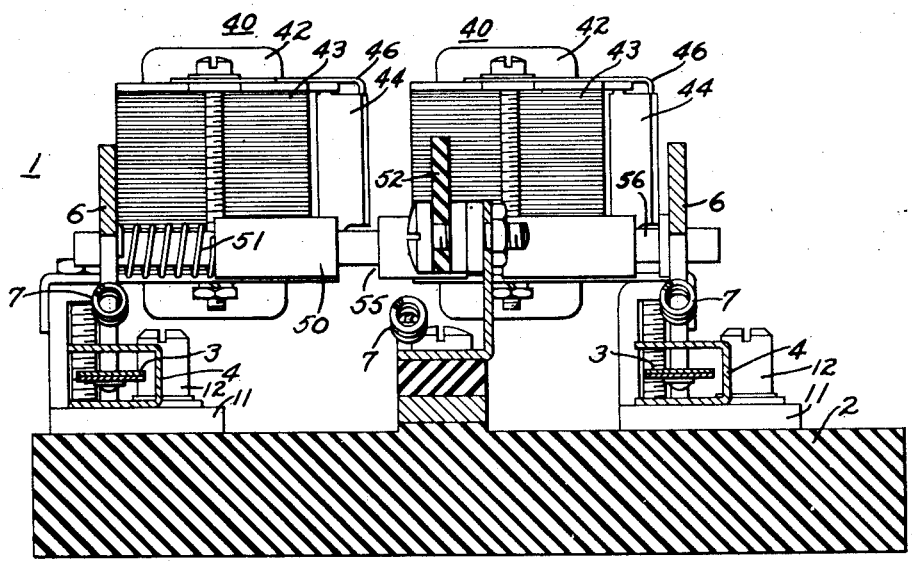
Fig. 3 is a vertical sectional view of the relay of Fig. 1, taken along the line III—III in Fig. 1.
Figure 9:
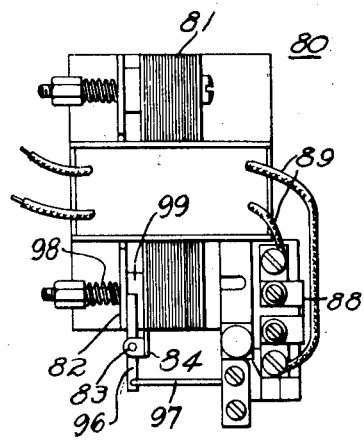
Figure 10:
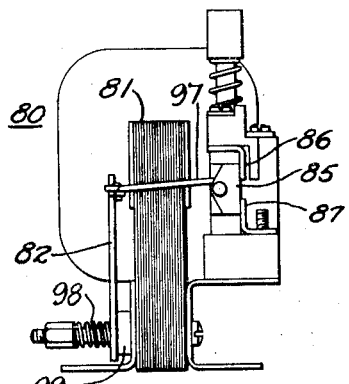

As shown in Figs. 8, 9 and 10, a transformer 80 the primary winding of which carries the motor current, is provided with a magnetic core 81 to become saturated at a certain load current. An armature 82, adjacent the core 81 is biased on spring 98 against a spacer 99 and is attracted by stray flux after saturation. The armature 82 may be arranged, as shown, to actuate a lever 86, pivoted on pin 83, thereby operating a bridging contact 85 to control the opening or closing of an external circuit between two cooperating stationary contact members 86 and 87. Those contact members 86 and 87 may be part of a thermal overload motor protective relay mounted on the side of the transformer and provided with a heater 8F connected in the secondary circuit of the transformer, by conductors 89, to heat a bimetal member, not shown, which, at moderately high overload currents will effect tripping of the contact member 85. At extremely high overload currents, the magnetic structure of the transformer is saturated, the leakage or stray flux attracts the armature 82, to instantly rotate lever 96 which through link 97 moves bridging contact 88 to control the circuit connected to the stationary contacts 86 and 87.

Figure 12:
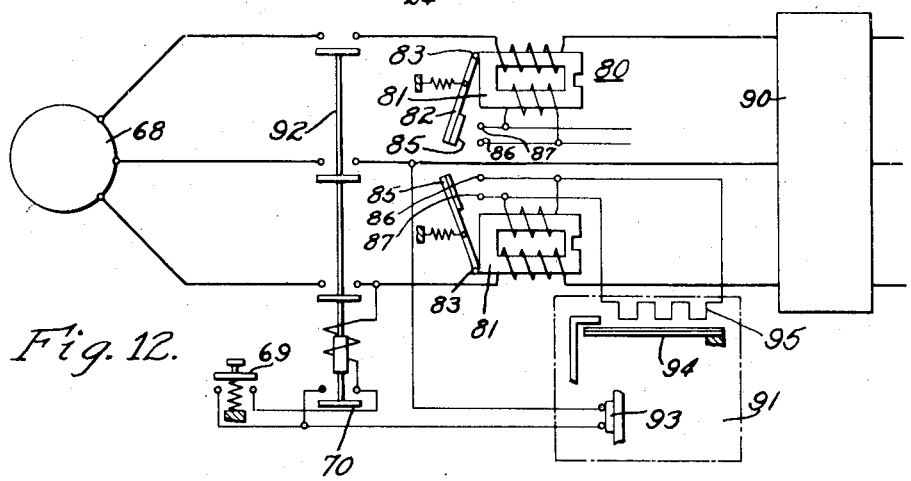

The armature 82 may be arranged to open the circuit, or to close the circuit, between the contacts 86 and 87. In Fig. 12 I have illustrated, in diagram, a simple circuit in which such a pivoted armature, associated with a transformer, closes the circuit between the associated contacts. In the arrangement shown in Fig. 12, the circuit controlled and established by those contacts serves to shunt the heater associated with the bimetal member in order to provide protection for the heater against excessive load currents. For such a system, a circuit breaker 90 is relied upon to disconnect the motor from the main circuit in case of such excessive load or short circuit conditions. For normal load conditions, the protection is supplied by an associated thermal relay 91 which may be arranged to open the circuit of the main contactor switch 92 by the relay switch 93 in response to the operation of bimetal element 94 associated with the heater 95.

Various modifications may be made in the devices embodying my invention, without departing from the spirit and scope thereof, and I desire that only such limitations shall be placed thereon as are imposed by the prior art and the appended claims.

I claim as my invention:

1. A relay for an electric circuit comprising, in combination, a saturable electromagnetic device including a winding, a heater resistor in electrical relationship with said winding, thereby receiving a proportionate share of an incoming current, a bimetallic thermal responsive element adjacent said heater resistor, an electrical switch, operating means actuable by said thermal responsive element when a predetermined value of incoming current is attained, for operating said switch and a second operating means for said switch actuable as the result of saturation of said electromagnetic device when the incoming current exceeds said predetermined value.

2. A relay for an electric circuit comprising, in combination, a saturable electromagnetic device including a winding, a heater resistor connected in parallel with said winding, thereby receiving a proportionate share of an incoming current, a thermal responsive element adjacent said heater resistor, an electrical switch, operating means actuable by said thermal responsive element when a predetermined value of incoming current is attained, for operating said switch and a second operating means actuable as the result of saturation of said electromagnetic device when the incoming current exceeds said predetermined value, said second operating means including parts which are common with said first operating means, said second operating means also being effective to operate said electrical switch.

3. A relay for an electric circuit comprising, in combination, a saturable electromagnetic device including a winding, a heater resistor connected in parallel with said winding, thereby receiving a proportionate share of an incoming current, a thermal responsive element adjacent said heater resistor, an electrical switch, pivoted means including a cross bar for supporting one of the contact elements of said switch, actuating means normally biased for moving said cross bar to operate said switch, latch means for normally restraining said bias, said thermal responsive element being effective as the result of a predetermined amount of incoming current and heat developed by said resistor to unlatch said latch means to remove said restraint, and operating means responsive to saturation of said electromagnetic device as the result of an incoming current which is greater than said predetermined amount, said operating means also being effective to move said bar to operate said switch.

4. A relay provided with a heat-responsive device and a heating element therefor, contact members, pivoted supporting means for one of said contact members, biasing means for said pivoted supporting means, a latching element for normally retaining said actuating element and which is releasable by the heat responsive device for permitting movement of said pivoted supporting means by said actuating element in opposition to said biasing means, reactor means paralleling the heating element and having a core with saturating characteristics which permit the major portion of a current to traverse the heating element at low current values below saturation and which permit the reactor to transmit a greater proportion of current at high current values above saturation, whereby the relay may have an inverse time element characteristic, a second latching means, a second actuating member, and means responsive to short-circuit saturation characteristics of the reactor for controlling said second latching means to release said second actuating member which in turn operates said pivoted contact supporting means and selectively operates said contact members.

5. A relay provided with a heat-responsive device and a heating element therefor, contact members, actuating means for disengaging one of said contact members from the other, pivoted supporting means for one of said contact members, latching means for normally restraining said actuating means from engagement with said pivoted supporting means, reactor means paralleling the heating element and having a core with saturating characteristics which permit the major portion of a current to traverse the heating element at low current values below saturation of the core and which permit the reactor to transmit a greater proportion of the current at high current values above saturation, whereby the relay may have an inverse time element characteristic, a pivoted armature adjacent the reactor core and means controlled by the armature for controlling said latching means to operate said contact supporting means, and means including a second latching means and being controlled by said heat responsive device for alternately operating said contact supporting means.

6. A relay provided with a heat-responsive device and a heating element therefor, contact members, means biasing them to engaged position, supporting means for one of said contact members, actuating means, latching means for said actuating means, a second biasing means for biasing said actuating means so as to effect opening of said contact members, reactor means paralleling the heating element and having a core with saturating characteristics which permit the major portion of a current to traverse the heating element at low circuit current values below saturation and which permit the reactor to transmit a greater proportion of the current at high current values above saturation, whereby the relay may have an inverse time element characteristic, said heat-responsive device being effective for releasing the actuating means, a pivoted armature adjacent the reactor core, a second actuating means, and means controlled by the armature for releasing the second actuating means to move the supporting means thereby opening said contact members.

7. An overload relay comprising cooperating contact members, means biasing them closed, actuating means to effect opening of said contact members and latching means for normally latching said actuating means, a heating resistor and a heat-responsive device responsive to an incoming current for controlling the latching means, and an instantaneous trip device including a magnetic winding which shunts said heating resistor and is responsive to rapid current increases above a certain value for effecting operation of said contact members.

8. An overload relay comprising cooperating contact members, actuating means for operating one of said contact members, and latching means normally rendering said actuating means ineffective to operate said contact members, a heater and a heat-responsive device responsive to a current for controlling the latching means, an instantaneous trip device including a second latching means and responsive to rapid increases of said current above a certain value for controlling said second latching means, said instantaneous means comprising a reactor with a saturating core bridging the heater, and a pivoted armature responsive to the flux of the core after saturation and means operated by said armature for alternately operating said contact member.

9. An overload relay comprising contact members, actuating means for disengaging one of said contact members from the other, latching means to normally render said actuating means ineffective to open said contact members, heat-responsive means to release the latching means, a heater to be energized by a current to heat the heat-responsive means, a reactor shunt bridging the heater and having a core that will saturate at a predetermined current through the reactor shunt, and means controlled by the reactor shunt for alternately operating said contact members.

10. An overload relay comprising contact members, actuating means for opening said contact members, latching means to normally render said actuating means ineffective to open said contact members, heat-responsive means to release the latching means, a heater to be energized by the circuit current to heat the heat-responsive means, a reactor shunt bridging the heater and having a core that will saturate at a predetermined current through the reactor shunt, a second latching means, and means responsive to the degree of energization of the reactor shunt for controlling said second latching means so as to effect opening of said contact members.

11. An overload relay comprising contact members, actuating means for opening said contact members, latching means to normally render said actuating means ineffective to open said contact members, heat-responsive means to release the latching means, a heater to be energized by the circuit current to heat the heat-responsive means, a reactor shunt bridging the heater and having a core than will saturate at a predetermined current through the reactor shunt, a second latching means, and means responsive to energization of the reactor shunt above saturation for controlling said second latching means so as to effect opening of said contact members.

12. An overload relay for an electric circuit, comprising contact members, actuating means for disengaging one of said contact members from the other, latching means normally rendering said actuating means ineffective to open said contact members, heat-responsive means to release the latching means, means for increasing the normal time element of response of the heat-responsive means at overload current values, a second latching means, and means responsive to said time-increasing means for establishing direct-trip control of said second latching means upon the occurrence of an excessive increase of said current so as to effect opening of said contact members.

13. An overload relay for an electric circuit, comprising a heater to be energized by an incoming current, a heat-responsive element to be heated thereby, a contact member operable by the heat-responsive element, and self-saturating means energized by said incoming current and operative to modify the amount of current to the heater below certain incoming current values to permit the heat responsive element to control the contact member, and operative as the result of saturation of said saturating means to establish independent action upon the contact member.

14. An overload relay for an electric circuit comprising a heater to be energized by an incoming current, a heat-responsive element to be heated thereby, a contact member operable by the heat-responsive element, and means energized by said incoming current and operative to modify the amount of current to the heater below certain incoming current values to permit the heat-responsive element to control the contact member, said means embodying a saturable magnetic structure and an armature responsive to stray flux from said magnetic structure after saturation occurring at said values, the armature operating directly and independently of the heat-responsive element to actuate the contact member.

GEO. C. ARMSTRONG.